No. 868,168. PATENTED OCT. 15, 1907.
W. W. DOOLITTLE.
PROCESS OF MAKING PIPE NIPPLES.
APPLICATION FILED APR. 15, 1907.

WITNESSES
INVENTOR

UNITED STATES PATENT OFFICE.

WILLIAM W. DOOLITTLE, OF EVANSTON, ILLINOIS, ASSIGNOR TO CRANE COMPANY, OF CHICAGO, ILLINOIS, A CORPORATION OF ILLINOIS.

PROCESS OF MAKING PIPE-NIPPLES.

No. 868,168.  Specification of Letters Patent.  Patented Oct. 15, 1907.

Application filed April 15, 1907. Serial No. 368,307.

*To all whom it may concern:*

Be it known that I, WILLIAM W. DOOLITTLE, a citizen of the United States, residing at Evanston, in the county of Cook and State of Illinois, have invented certain new and useful Improvements in Processes of Making Pipe-Nipples, of which the following is a specification.

Figure 1:
Figure 2:
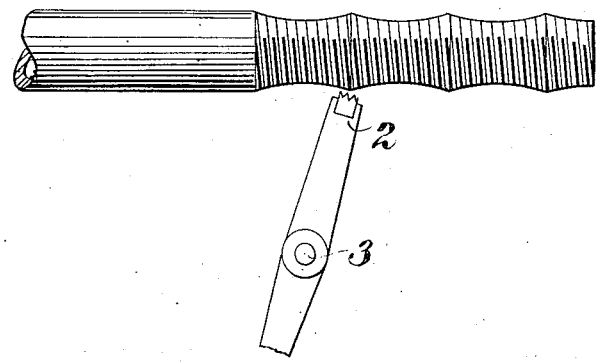

My invention relates to processes for making tapered pipe nipples; and has for its object; the provision of an improved process whereby externally threaded tapered nipples may be formed from an extended blank at greater speed and at less cost than has heretofore been done. The steps of the process are illustrated in the accompanying diagrammatic views, wherein Figure 1 shows a section of ordinary pipe from which the nipples are to be formed, Figure 2 shows the pipe after the threading operation has been started, and a few nipple lengths threaded, Figure 3 shows the pipe at a further stage of the process, more nipple lengths having been threaded, and the cutting-off tool operated to cut off the first nipple, and Figure 4 shows a longitudinal section through a completed nipple.

Figure 4:
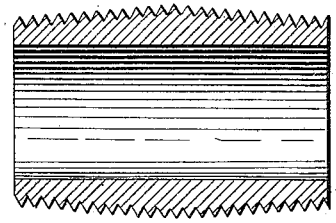

The process is designed for the production of externally threaded pipe nipples of the usual type, as shown in Figure 4, wherein the nipples taper from the center to each end, and the process consists in rotating an extended pipe length, and in moving a threading tool successively longitudinally of the blank in a series of arcs, thereby giving a series of cuts of gradually decreasing depth from the center of the arc to the ends thereof, and then cutting the blank into nipple lengths at points midway between the points of greatest diameter.

Figure 3:
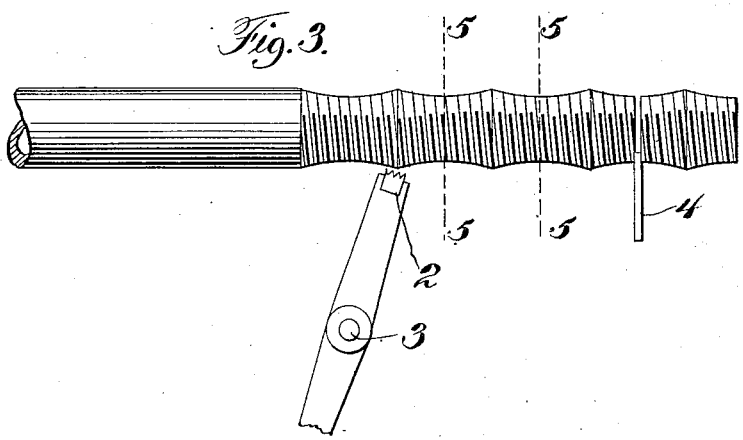

As shown in the drawings, 1 is the pipe blank which may be rotated in any suitable manner, 2 is the threading tool mounted on a pivot 3 to swing longitudinally of the axis of the pipe, and in substantially the same plane as such axis, and 4 is a cutting-off tool for severing the pipe into nipples at the dotted lines 5 after the threading, as shown in Fig. 3. In operation, the pipe blank 1, and the supporting pivot 3 are moved relatively longitudinally step-by-step the length of a nipple, and at each step the tool is swung in its arc to thread a length of rotating pipe equal to the length of a nipple. The nipples are then cut off by the tool 4. As the die swings in an arc of a circle, the line of bevel is, of course, not a right line, but is slightly curved. The departure from a right line is so slight, however, that in practice the nipples fit with the desired degree of accuracy. The process may be practiced in an ordinary lathe having the tool pivoted to swing in the plane of the pipe, and in which either the pipe or the tool holder is given a step-by-step movement longitudinally, or in machines designed especially for the purpose, as shown in my pending applications, Nos. 329,889, and 329,888, filed August 9, 1906. The operation might also be performed crudely by a threading tool operated manually to press against a rotating pipe.

Having thus described my invention and illustrated its use, what I claim as new and desire to secure by Letters Patent is the following:—

The process of making tapered nipples from extended pipe blanks, which consists in giving a blank and a threading tool relative rotative movement about the axis of the blank and in moving the threading tool successively longitudinally of the blank in a series of arcs thereby giving cuts deepest at the centers of the arcs and gradually decreasing in depth to the ends thereof, and subsequently cutting the threaded blank into sections at the points of least diameter.

In testimony whereof I have hereunto signed my name in the presence of the two subscribed witnesses.

WILLIAM W. DOOLITTLE.

Witnesses:
 PAUL CARPENTER,
 JAMES NICHOLAS LORENZ.